United States Patent
Manzouji et al.

[11] Patent Number: 6,072,013
[45] Date of Patent: Jun. 6, 2000

[54] SILICONE-GRAFTED VINYL POLYMER AND METHOD FOR THE PREPARATION THEREOF

[75] Inventors: Ryuko Manzouji; Tadashi Okawa; Ryuzo Mikami, all of Chiba Prefecture, Japan

[73] Assignee: Dow Corning Toray Silicone Co., Ltd., Tokyo, Japan

[21] Appl. No.: 09/200,393

[22] Filed: Nov. 24, 1998

[30] Foreign Application Priority Data

Nov. 27, 1997 [JP] Japan .................................. 9-342037

[51] Int. Cl.⁷ ...................................................... C08F 20/10
[52] U.S. Cl. ............................................... 526/279; 528/32
[58] Field of Search ............................... 526/279; 528/32

[56] References Cited

U.S. PATENT DOCUMENTS 5,045,621  9/1991  Suzuki ...................................... 528/41

FOREIGN PATENT DOCUMENTS 3-216385  9/1991  Japan .
6-256355  9/1994  Japan .

Primary Examiner—Robert Dawson
Assistant Examiner—Kuo-Liang Peng
Attorney, Agent, or Firm—Alex Weitz

[57] ABSTRACT

There is disclosed a silicone-grafted vinyl polymer and a method for the preparation thereof, said polymer having grafted silicone side chains of the formula:

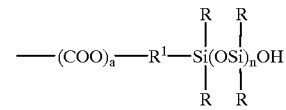

as well as grafted silicone side chains of the formula:

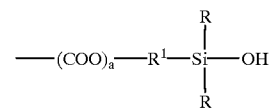

wherein R independently represents a monovalent hydrocarbon group which is free of aliphatic unsaturation, $R^1$ is a divalent group selected from hydrocarbon groups or alkyleneoxyalkylene groups, a is 0 or 1 and n is an integer having a value of at least 1.

10 Claims, No Drawings

SILICONE-GRAFTED VINYL POLYMER AND METHOD FOR THE PREPARATION THEREOF

FIELD OF THE INVENTION

The present invention relates to a novel silicone-grafted vinyl polymer and to a method for the preparation thereof. More particularly, the present invention relates to a novel silicone-grafted vinyl polymer into which silanol-endblocked silicone chains have been grafted and to a method for the synthesis of this novel polymer.

BACKGROUND OF THE INVENTION

Within the art of silicone chain-grafted vinyl polymers, Japanese Patent Application Laid Open (Kokai or Unexamined) Number Hei 3-216385 (216,385/1991) teaches a copolymer obtained by the copolymerization of radically polymerizable alkoxysilyl-functional monomer, silicone macromonomer bearing a radically polymerizable group, and other radically polymerizable monomer. This copolymer can be crosslinked through moisture-induced hydrolysis of the alkoxysilyl groups in the molecule to give silanol groups and condensation between these silanol groups with the formation of siloxane bonds. The resulting cured material is reported to have excellent release properties and very good slip properties (low coefficient of friction) resulting from the presence of the silicone macromonomer. At the same time, however, this copolymer has a very slow cure rate due to the slow rate at which silanol groups are produced by hydrolysis of the alkoxysilyl groups. In addition, because the grafted silicone chains in this copolymer are freely mobile, they re-partition with elapsed time into the interior of the cured material, resulting in a deterioration with time of both the release and slip properties of the cured material.

There have been, on the other hand, no reports of a vinyl polymer having two different types of silanol-endblocked silicone grafts.

SUMMARY OF THE INVENTION

An object of the present invention is to provide a silicone-grafted vinyl polymer into which two different silanol-endblocked silicone chains have been grafted. An additional object of the present invention is to provide a method for the synthesis of this polymer.

The present invention claims a silicone-grafted vinyl polymer into which silicone chains with both formula (A) and formula (B) are grafted as side chains:

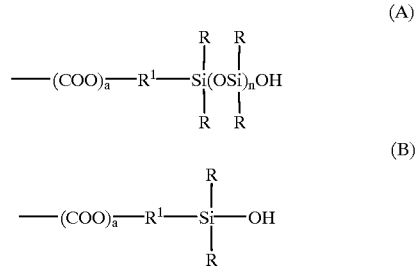

wherein R represents a monovalent hydrocarbon group free of aliphatic unsaturation groups, $R^1$ is selected from divalent hydrocarbon groups and alkyleneoxyalkylene groups, a is 0 or 1, and n is an integer with a value of at least 1. The invention additionally relates to a method for preparing said silicone-grafted vinyl polymer, said method being characterized by copolymerizing a silicone macromonomer with a silanol-functional monomer and, optionally, a polymerizable vinyl monomer.

DETAILED DESCRIPTION OF THE INVENTION

To explain the preceding in greater detail, the vinyl polymer of the invention is a polymer into which the two different silicone chains represented by formulas (A) and (B), shown above, have both been grafted as side chains.

In these formulas, R independently represents a monovalent hydrocarbon group which is free of aliphatic unsaturation. R is exemplified by alkyl, such as methyl, ethyl, propyl, butyl, and hexyl; aryl, such as phenyl, tolyl, and xylyl; and aralkyl, such as benzyl or phenethyl. $R^1$ in the preceding formulas is independently selected from divalent hydrocarbon groups or alkyleneoxyalkylene groups. The former can be exemplified by ethylene, propylene, butylene, and hexylene, while the latter can be exemplified by ethyleneoxypropylene. The subscript a is 0 or 1, and the subscript n is an integer with a value of at least 1, preferably with a value from 10 to 200, and more preferably with a value from 20 to 150.

The silicone-grafted vinyl polymer according to the invention can be exemplified by the following general formula, wherein the terminal groups are not explicitly shown:

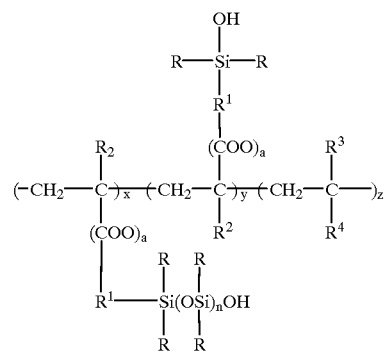

in which R, $R^1$, a, and n are defined as above. $R^2$ in the preceding formula can be independently hydrogen or a monovalent hydrocarbon group free of aliphatic unsaturation. The monovalent hydrocarbon groups encompassed by $R^2$ can be exemplified by alkyl, such as methyl, ethyl, propyl, butyl, and hexyl; aryl, such as phenyl, tolyl, and xylyl; and aralkyl, such as benzyl and phenethyl. $R^3$ in the preceding formula is selected from hydrogen atom, chlorine atom, or monovalent hydrocarbon groups free of aliphatic unsaturation. The monovalent hydrocarbon groups encompassed by $R^3$ can be exemplified by the same groups as R. R4 in the preceding formula represent a monovalent organic group and can be exemplified by monovalent hydrocarbon groups such as aryl groups, cycloalkyl groups, cyano group, chlorine, hydrogen, and groups with the formulas —C(=O)—$OR^5$, —O—C(=O)—$R^5$, —C(=O)—$NR^5_2$, —C(=O)—$R^5$. $R^5$ in the preceding formulas is selected from hydrogen, chlorine atom, alkali metal, monovalent hydrocarbon groups, aminoalkyl group, and carbinol group. $R^4$ can be specifically exemplified by groups with the following formulas: —C(=O)—O—$CH_2CH_2$—$N(CH_3)_2$, —C(=O)—O—CH₂CH₂OH, —C(=O)—OH, —O—C(=O)—CH₃, —O—C(=O)—phenyl, —C(=O)—N(CH₃)₂, —C(=O)—NH₂, and —C(=O)—H. In addition to the preceding, $R^4$ can be exemplified by groups with the following formulas:

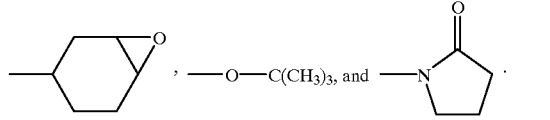

The subscripts x, y, and z in the polymer under discussion are numbers with the following values: x>0, y>0, and z≧0. The mole percent ratios for x : y : z are preferably =0.02 to 5.00:0.30 to 99.98:0 to 99.7 mole %, more preferably 0.1 to 3.0:1 to 90:0 to 98.9 mole %, and particularly preferably 0.5 to 2.0:3 to 80:0 to 96.5 mole %. The number-average molecular weight of the subject silicone-grafted vinyl polymer should generally be no greater than 500,000 and is preferably from 1,000 to 300,000 and particularly preferably from 10,000 to 200,000.

The subject silicone-grafted vinyl polymer can be synthesized, for example, by copolymerizing (a) a silicone macromonomer of the formula:

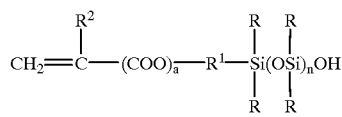

(i)

with (b) a polymerizable monomer of the formula:

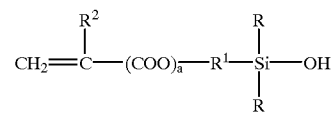

(ii)

and, optionally, (c) a polymerizable vinyl monomer other than component (a) or (b).

The silicone macromonomer (a) is a siloxane having a methacrylate or acrylate group at one terminal and a silanol group at the other terminal. R, $R^1$, $R^2$, a, and n in formula (i) are defined as above. When one considers the copolymerizability with the other component or components, silicone macromonomer (a) preferably has an average molecular weight from 500 to 50,000 and particularly preferably from 1,000 to 20,000. The silicone macromonomer (a) can be synthesized, for example, by living anion polymerization of a cyclic trisiloxane using lithium methacryloxypropyldimethylsilanolate as polymerization initiator and stopping the polymerization with an acid such as acetic acid.

Component (a) can be exemplified by the siloxanes of the following formulas.

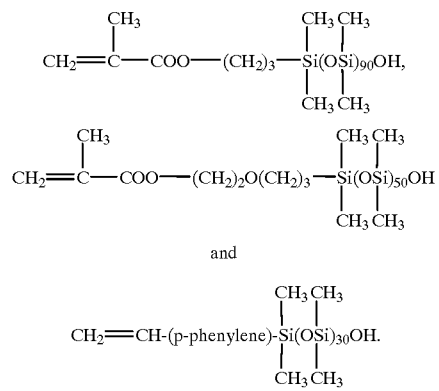

The polymerizable monomer (b) is a methacrylate- or acrylate-functional silanol. R, $R^1$, $R^2$, and a in formula (ii) are defined as above. This silanol can be synthesized, for example, by the hydrolysis of methacrylate-functional chlorosilane with the following formulas (refer to Japanese Patent Application Laid Open (Kokai or Unexamined) Number Hei 6-256355 (256,355/1994)).

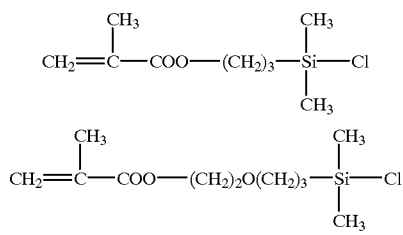

Component (b) can be exemplified by silanols with the following formulas:

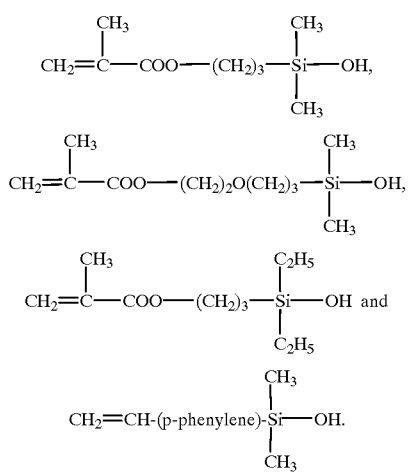

The polymerizable vinyl monomer (c) is a radically polymerizable vinyl monomer, other than the components (a) or (b) described above, that is also copolymerizable with components (a) and (b). Component (c) should be capable of vinyl polymerization but is not otherwise restricted. Component (c) can be exemplified by acrylic acid, methacrylic acid, acrylate esters, methacrylate esters, vinyl acetate, vinylidene chloride, vinyl chloride, polyalkylene glycol monomethacrylate, and by the following compounds:

$CH_2=CH-C(=O)-O-(CH_2)_2-N(CH_3)_2$, $CH_2=CH-C(=O)-H$, $CH_2=CH-O-C(=O)CH_3$, $CH_2=CH-O-C(=O)$—phenyl, $CH_2=CH-C(=O)-N(CH_3)_2$, $CH_2=CH-C(=O)-NH_2$ Combinations of two or more of these polymerizable vinyl monomers may also be used as component (c).

The vinyl polymer of the present invention is synthesized by the radical copolymerization of the above-described components (a) and (b) and optional component (c). This radical copolymerization can be carried out by known polymerization techniques. The copolymerization ratio of the various components will vary with the degree of polymerization of the silicone macromonomer and the nature of the copolymerized monomer component, but the component (a): component (b): component (c) molar ratio will generally be in the range 0.02 to 5.00:0.30 to 99.98:0 to 99.7 and will preferably be in the range 0.1 to 3.0: 1 to 90:0 to 98.9, respectively. The radical polymerization initiator used for this radical copolymerization can be, for example, an azo compound such as azobisisobutyronitrile, or a peroxide such as benzoyl peroxide or dicumyl peroxide. The polymerization can be carried out by solution polymerization, emulsion polymerization, suspension polymerization, or bulk polymerization techniques. An advantageous technique comprises solution polymerization in which components (a), (b), and (c) are homogeneously dissolved and polymerized in a homogeneous system. The solvent used for this purpose will vary with the nature and content of component (c), but can be generally exemplified by aromatic hydrocarbons such as benzene, toluene, and xylene; ketones such as methyl ethyl ketone and methyl isobutyl ketone; esters such as ethyl acetate and butyl acetate; and ethers such as tetrahydrofuran, dioxane, and diethyl ether. Combinations of two or more of the preceding solvents can also be used as the solvent in the solution polymerization.

The silicone-grafted vinyl polymer of this invention as described above is a novel polymer in which two different types of silanol-endblocked silicone chains are grafted. This vinyl polymer, because it contains highly reactive silanol at the terminals of the grafted silicone side chains, cures rapidly by condensation crosslinking in the presence of hydrolyzable silane and a catalyst for the silanol condensation reaction. At the same time, it has the advantage of undergoing very little post-cure variation in such properties as releaseability and low coefficient of friction (high slip) as a function of time. The hydrolyzable silane can be exemplified by alkoxysilanes such as tetramethoxysilane, methyltrimethoxysilane, vinyltrimethoxysilane, and phenyltrimethoxysilane and by the partial hydrolyzates of such alkoxysilanes. The silanol condensation catalyst can be exemplified by dibutyltin dilaurate, dibutyltin dioctoate, dibutyltin diacetate, tetrabutoxytitanium, and tetraisopropoxytitanium. Since this reaction involves the reaction between silanol and alkoxysilyl, curing can proceed rapidly without regard to the presence or absence of atmospheric moisture. Moreover, the prior art alkoxysilyl-functional vinyl polymer suffers from a poor storage stability due to the occurrence of gelation occasioned by the absorption of atmospheric moisture during storage and ensuing condensation reaction. In contrast to this, the silicone-grafted vinyl polymer of the present invention is characterized by an excellent storage stability since it contains silanol.

The silanol-grafted vinyl polymers of the invention find utility in the preparation of release coatings having medium to high release force.

EXAMPLES

The invention is explained in greater detail hereinbelow through working examples. Me designates the methyl group in these examples. The number-average molecular weight values reported for the silicone-grafted vinyl polymer products were measured by gel permeation chromatography (GPC) using polystyrene standards.

Synthesis Example 1

Twenty-five grams of water, 41.4 g (408.7 mmol) of triethylamine, and 70 mL of hexane were placed in a 500-mL flask equipped with a stirrer, thermometer, and addition funnel. A mixture of 30 g (136.2 mmol) methacryloxypropyldimethyl-chlorosilane and 30 mL hexane was added to the flask dropwise while cooling with a water bath so as to prevent the reaction temperature from exceeding 30° C. After completion of the addition, stirring was carried out for an additional 1 hour and it was then confirmed that the pH was not acidic. The flask was brought to quiescence, the water layer was separated off, and the recovered organic layer was washed 3 times with water. 2,6-di-tert-butyl-4-methylphenol (0.06 g) was then added to the organic layer and azeotropic dehydration was run for 1 hour. After the completion of azeotropic dehydration, the hexane was distilled from the reaction mixture by heating under reduced pressure to give 27 g reaction product. This reaction product was confirmed by nuclear magnetic resonance analysis (NMR) to be the methacryloxypropyldimethylsilanol with the formula given below. The purity of this silanol compound was 99% by gas chromatography (GLC).

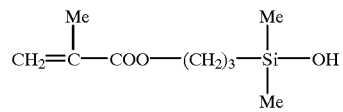

Synthesis Example 2

Toluene (188 g) and 247 g of hexamethylcyclotrisiloxane (3.337 mol) were introduced into and mixed in a 1-liter flask equipped with a stirrer, thermometer, condenser, and nitrogen inlet tube and an azeotropic dehydration was run for 1 hour on the mixture. Then, after cooling to room temperature and purging the system with nitrogen, 250.2 microliter of a 1.68 N hexane solution of n-butyllithium (0.4203337 mmol) was introduced and the flask was stirred at room temperature for 10 minutes. A polymerization reaction was then initiated by the addition of a mixture of 10.72 g (52.98 mmol) of the methacryloxypropyldimethylsilanol synthesized in Synthesis Example 1, 19.8 g of dimethylformamide, and 61.8 g of acetonitrile. The progress of the polymerization reaction was monitored by GLC and the reaction was stopped by the addition of acetic acid when the conversion of the hexamethylcyclotrisiloxane reached about 81.0%. Hydroquinone monomethyl ether (12.9 mg) was added to the toluene solution and the low boilers were then distilled off by heating at reduced pressure to give 217.3 g of a colorless, transparent liquid. Analysis of this liquid by NMR and infrared absorption spectroscopy (IR) confirmed the liquid to be the silicone macromonomer with the average compositional formula given below.

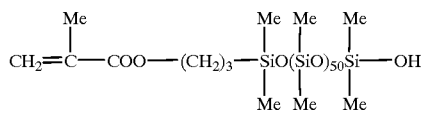

The number-average molecular weight of this silicone macromonomer was 5,290 and the dispersity was 1.10 by GPC.

Example 1

Toluene (30 g) was introduced into a 100-mL flask equipped with a stirrer, thermometer, condenser, and nitrogen inlet tube and the dissolved oxygen was removed by bubbling in nitrogen for 30 minutes. Butyl acrylate (13 g), 1 g of the methacryloxypropyldimethylsilanol synthesized in Synthesis Example 1, 6 g of the silicone macromonomer synthesized in Synthesis Example 2, and 0.4 g of azobisisobutyronitrile were introduced into the flask, and nitrogen was then bubbled through for another 30 minutes. The reaction mixture was stirred for 24 hours with heating at 60° C. under a nitrogen atmosphere, at which point it was confirmed by GPC analysis that the peaks for the butyl acrylate, methacryloxypropyldimethylsilanol, and silicone macromonomer starting reagents had almost completely disappeared. The toluene and unreacted butyl acrylate were removed from the solution by heating under reduced pressure to give 20.3 g of a semisolid reaction product. NMR and IR analyses of this reaction product identified it as the silicone-grafted polyacrylate with the following average compositional formula:

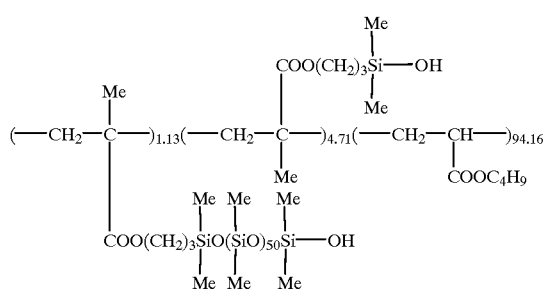

This silicone-grafted polyacrylate had a number-average molecular weight of 53,811 by GPC.

Example 2

A toluene solution of a reaction mixture was obtained by running a reaction as described for Example 1, with the exception that in this example dimethyl 2,2-azobis(2-methylpropionate) was used as polymerization initiator in place of the azobisisobutyronitrile used in Example 1. Analysis of this toluene solution by GPC confirmed that the peaks for the butyl acrylate, methacryloxypropyldimethylsilanol, and silicone macromonomer starting reagents had almost completely disappeared. The toluene and unreacted butyl acrylate were removed from the solution by heating under reduced pressure to give 20.3 g of a semisolid reaction product. NMR and IR analyses of this reaction product identified it as the silicone-grafted polyacrylate with the following average compositional formula:

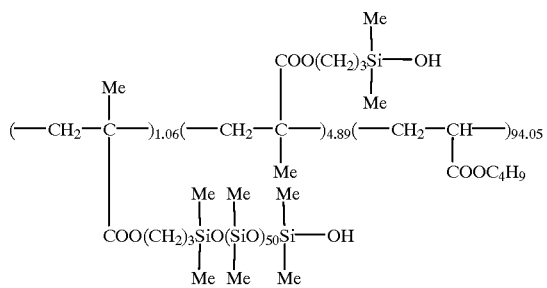

This silicone-grafted polyacrylate had a number-average molecular weight of 69,720 by GPC.

Example 3

A toluene solution of a reaction mixture was obtained by running a reaction as described for Example 1, but using 12 g of the butyl acrylate and 2 g of the methacryloxypropyldimethylsilanol synthesized in Synthesis Example 1. Analysis of this toluene solution by GPC confirmed that the peaks for the butyl acrylate, methacryloxypropyldimethylsilanol, and silicone macromonomer starting reagents had almost completely disappeared. The toluene and unreacted butyl acrylate were removed from the solution by heating under reduced pressure to give 20.2 g of a semisolid reaction product. NMR and IR analyses of this reaction product identified it as the silicone-grafted polyacrylate with the following average compositional formula:

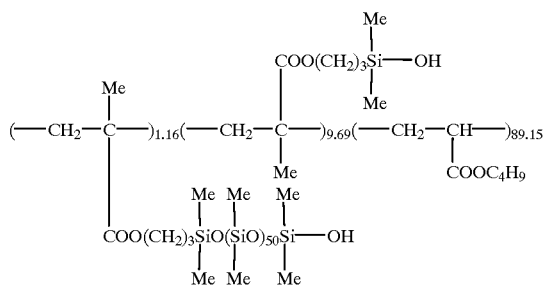

This silicone-grafted polyacrylate had a number-average molecular weight of 76,870 by GPC.

Example 4

A toluene solution of a reaction mixture was obtained by running a reaction as described for Example 1, but using 15.87 g of the butyl acrylate, 1.13 g of the methacryloxypropyldimethylsilanol synthesized in Synthesis Example 1, and 3 g of the silicone macromonomer synthesized in Synthesis Example 2. Analysis of this toluene solution by GPC confirmed that the peaks for the butyl acrylate, methacryloxypropyldimethylsilanol, and silicone macromonomer starting reagents had almost completely disappeared. The toluene and unreacted butyl acrylate were removed from the solution by heating under reduced pressure to give 20.1 g of a semisolid reaction product. NMR and IR analyses of this reaction product identified it as the silicone-grafted polyacrylate with the following average compositional formula:

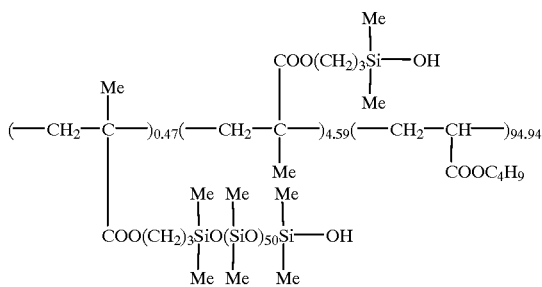

This silicone-grafted polyacrylate had a number-average molecular weight of 85,979 by gpc.

What is claimed is:

1. A silicone-grafted vinyl polymer having grafted silicone side chains of the formula:

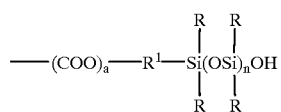

as well as grafted silicone side chains of the formula:

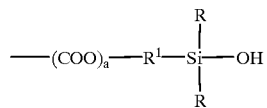

wherein R independently represents a monovalent hydrocarbon group which is free of aliphatic unsaturation, $R^1$ is a divalent group independently selected from hydrocarbon groups or alkyleneoxyalkylene groups, a is 0 or 1 and n is an integer having a value of at least 1.

2. The silicone-grafted vinyl polymer according to claim 1 having the formula:

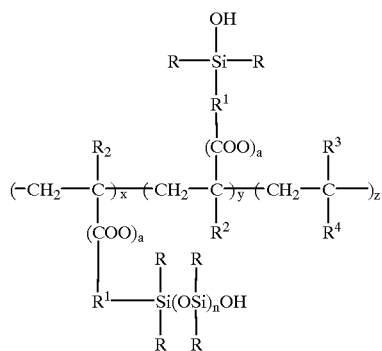

wherein R independently represents a monovalent hydrocarbon group which is free of aliphatic unsaturation, $R^1$ is a divalent group independently selected from hydrocarbon groups or alkyleneoxyalkylene groups, $R^2$ is independently selected from hydrogen or monovalent hydrocarbon groups which are free of aliphatic unsaturation, $R^3$ is selected from hydrogen, chlorine, or monovalent hydrocarbon groups which are free of aliphatic unsaturation, $R^4$ represents monovalent organic groups, a is 0 or 1, n is an integer having a value of at least 1, x and y are each greater than zero and $z \geq 0$, said polymer having a number average molecular weight no greater than 500,000.

3. The silicone-grafted vinyl polymer according to claim 1, wherein R is methyl.

4. The silicone-grafted vinyl polymer according to claim 3, wherein $R^1$ is selected from ethylene, propylene, butylene, hexylene or ethyleneoxypropylene.

5. A method for the preparing the silicone-grafted vinyl polymer according to claim 1, said method comprising copolymerizing (a) a silicone macromonomer of the formula:

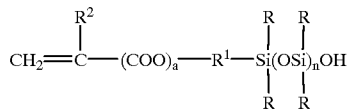

with (b) a polymerizable monomer of the formula:

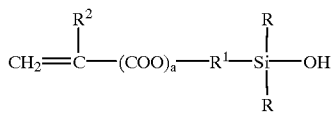

and, optionally, with (c) a polymerizable vinyl monomer other than said components (a) or (b), wherein R independently represents a monovalent hydrocarbon group which is free of aliphatic unsaturation, $R^1$ is a divalent group independently selected from hydrocarbon groups or alkyleneoxyalkylene groups, $R^2$ is independently selected from hydrogen or monovalent hydrocarbon groups which are free of aliphatic unsaturation, a is 0 or 1, and n is an integer having a value of at least 1.

6. The method according to claim 5, wherein R is methyl.

7. The method according to claim 6, wherein $R^1$ is selected from ethylene, propylene, butylene, hexylene or ethyleneoxypropylene.

8. The method according to claim 5, wherein said polymerizable vinyl monomer (c) is selected from acrylic acid, methacrylic acid, acrylate esters, methacrylate esters, vinyl acetate, vinylidene chloride, vinyl chloride or polyalkylene glycol monomethacrylate.

9. The method according to claim 8, wherein R is methyl.

10. The method according to claim 9, wherein $R^1$ is selected from ethylene, propylene, butylene, hexylene or ethyleneoxypropylene.

* * * * *